Patented Dec. 30, 1952

2,623,902

UNITED STATES PATENT OFFICE 2,623,902

BIS-QUATERNARY AMMONIUM SALTS

Frank S. Crossley, Collingdale, Pa., assignor to Sharp & Dohme, Incorporated, Philadelphia, Pa., a corporation of Maryland No Drawing. Application March 15, 1950, Serial No. 149,878

4 Claims. (Cl. 260—567.6)

This invention is concerned broadly with certain new chemical compounds, namely certain new bis-quaternary ammonium salts. More specifically it is concerned with bis-quaternary salts resulting from the addition of a benzyl quaternizing agent to certain bis-tertiary amines.

The compounds of this invention can be represented by the general formula:

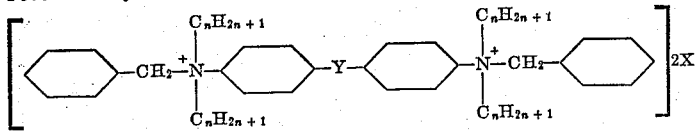

in which Y is a divalent aliphatic hydrocarbon radical containing from two to 20 carbon atoms, and in which the available valence bonds occur on the same carbon atom, $n$ is a whole number, at least one and less than five, and X is an anion. The aliphatic hydrocarbon portion of the molecule, Y, is derived from an aliphatic hydrocarbon containing from 2 to 20 carbon atoms, one carbon atom of which is either trisubstituted or is tetrasubstituted, and in each case two of the valences are substituted by ammonium substituted phenyl groups.

More particularly, the portion of the molecule represented in the general formula by Y can be derived from alkane, aralkane or cycloalkane. Examples of Y when it is alkylidene are seen in the divalent radicals ethylidene, isopropylidene, heptylidene, dodecylidene, 4-methylpentylidene, isobutylidene to mention only a few. When Y is aralkane it is illustrated by the divalent radicals benzylidene, 2-phenylethylidene and 1-phenylethylidene. Cyclopentylidene and cyclohexylidene are illustrations of divalent cycloalkane radicals embraced by the term Y in the general formula. These illustrations are not meant to be restrictive as the present invention embraces many compounds having divalent radicals other than those just recited as the Y portion of the molecule.

Another method of denominating the compounds of this invention is to describe them broadly as $z,z$-bis-[p-(benzyl-dialkyl-ammonium)-phenyl]-aliphatic hydrocarbon salts in which the aliphatic hydrocarbon portion of the molecule contains from 2 to 20 carbon atoms and $z$ is a whole number denoting the position of substitution of the ammonium phenyl radicals in the hydrocarbon portion.

The bis-tertiary amines used as starting materials for the preparation of the compounds of this invention either are known or can be prepared by known chemical methods. In general these bis-tertiary amines are obtained by reacting two moles of a dialkylaniline with an appropriate aldehyde or ketone, YO, in alcoholic solution and in the presence of hydrogen chloride according to the reaction:

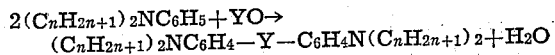

in which Y and $n$ have the meanings heretofore assigned.

The reactions involving an aldehyde proceed more easily than those involving a ketone. Similarly, the difficulty of reaction increases as the carbonyl carbon atom of the ketone is displaced inwardly from the end of the aliphatic chain. Thus, the $z,z$-bis[p-(dialkylamino)phenyl]aliphatic hydrocarbons in which $z$ is 1 or 2 are more easily obtained and preferably $z$ is 5 or less.

The compounds of this invention are obtained by reacting bis-tertiary amines of the general formula

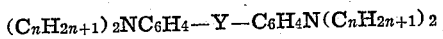

in which Y and $n$ have the meanings heretofore assigned, with a benzyl quaternizing agent such as benzyl chloride, iodide, bromide, or p-toluenesulfonate, according to the known procedures for producing quaternary compounds. An alternate method to obtain such salts as the iodide or bromide is to prepare the chloride and then treat a concentrated aqueous solution of the chloride with a considerable molar excess of potassium or sodium iodide or bromide in concentrated aqueous solution. The desired salt, i. e. iodide or bromide, separates from the solution.

Quaternary ammonium salts containing anions other than halide can be obtained by treating the bis-quaternary ammonium dichloride with silver oxide to produce the bis-quaternary ammonium dihydroxide, which can be separated from the excess silver oxide and precipitated silver chloride by filtration. The aqueous solution of bis-quaternary ammonium dihydroxide can then be treated with the appropriate acid to introduce the desired anion. For example, treatment of a bis-quaternary ammonium dihydroxide with sulfuric acid will produce the bis-quaternary ammonium sulfate. Similarly, a variety of anions such as the phosphate, p-toluene sulfonate, acetate, propionate, benzoate, and in general the carboxylate anion of an aliphatic acid, can be introduced.

It is to be noted that the anion, X, has little, if any, effect on the utility of the compounds.

For a given bis-quaternary ammonium radical, variance of the anion has only a minimum effect on the properties of the compounds.

The compounds of this invention are useful for curarization and possess the advantage over presently used curarizing agents of being ultra-short acting. Additionally, they have less residual depression of neuromuscular transmission, and less undesirable side effects than presently used curarizing agents. Further, the compounds of this invention exhibit antibacterial properties.

The compounds of this invention are illustrated by, but not restricted to, such compounds as:

1,1 - bis - [p - (benzyl - dimethyl - ammonium) - phenyl]-ethane dichloride.
1,1 - bis - [p - (benzyl - dimethyl - ammonium) - phenyl]-ethane dibromide.
1,1 - bis - [p - (benzyl - dimethyl - ammonium) - phenyl]-ethane di-iodide.
1,1 - bis - [p - (benzyl - dimethyl - ammonium) - phenyl]-propane dichloride.
1,1 - bis - [p - (benzyl - dimethyl - ammonium) - phenyl]-propane dibromide.
1,1 - bis - [p - (benzyl - dimethyl - ammonium) - phenyl]-butane dichloride.
1,1 - bis - [p - (benzyl - dimethyl - ammonium) - phenyl]-butane dibromide.
1,1 - bis - [p - (benzyl - dimethyl - ammonium) - phenyl]-butane di-iodide.
1,1 - bis - [p - (benzyl - dimethyl - ammonium) - phenyl]-butane sulfate.
1,1 - bis - [p - (benzyl - dimethyl - ammonium) - phenyl]-butane p-toluene sulfonate.
1,1 - bis - [p - (benzyl - dimethyl - ammonium) - phenyl]-butane di-acetate.
1,1 - bis - [p - (benzyl - dimethyl - ammonium) - phenyl]-2-methyl-propane dichloride.
1,1 - bis - [p - (benzyl - dimethyl - ammonium) - phenyl]-3-methyl-butane dichloride.
1,1 - bis - [p - (benzyl - dimethyl - ammonium) - phenyl]-pentane dichloride.
1,1 - bis - [p - (benzyl - dimethyl - ammonium) - phenyl]-pentane dibromide.
1,1 - bis - [p - (benzyl - dimethyl - ammonium) - phenyl]-hexane di-iodide.
1,1 - bis - [p - (benzyl - dimethyl - ammonium) - phenyl]-heptane dichloride.
1,1 - bis - [p - (benzyl - dimethyl - ammonium) - phenyl]-dodecane dichloride.
1,1 - bis - [p - (benzyl - dimethyl - ammonium) - phenyl]-nonadecane dichloride.
2,2 - bis - [p - (benzyl - dimethyl - ammonium) - phenyl]-propane dichloride.
2,2 - bis - [p - (benzyl - dimethyl - ammonium) - phenyl]-butane dichloride.
2,2 - bis - [p - (benzyl - dimethyl - ammonium) - phenyl]-4-methyl-pentane dibromide.
2,2 - bis - [p - (benzyl - dimethyl - ammonium) - phenyl]-octane dichloride.
3,3 - bis - [p - (benzyl - dimethyl - ammonium) - phenyl]-pentane dichloride.
Bis - [p - (benzyl - dimethyl - ammonium) -phenyl]-phenyl-methane dichloride.
Bis - [p - (benzyl - dimethyl - ammonium) -phenyl]-phenyl-methane dibromide.
Bis - [p - (benzyl - dimethyl - ammonium) -phenyl]-phenyl-methane sulfate.
Bis - [p - (benzyl - dimethyl - ammonium) -phenyl]-o-chlorophenyl-methane dichloride.
Bis - [p - (benzyl - dimethyl - ammonium) -phenyl]-p-chlorophenyl-methane dichloride.
Bis - [p - (benzyl - dimethyl - ammonium) -phenyl]-p-methoxyphenyl-methane dichloride.
Bis - [p - (benzyl - dimethyl - ammonium) -phenyl]-m,p-dimethoxyphenyl-methane dichloride.
Bis - [p - (benzyl - dimethyl - ammonium) -phenyl]-p-hydroxyphenyl-methane dichloride.
Bis - [p - (benzyl - dimethyl - ammonium) -phenyl]-p-nitrophenyl-methane dichloride.
Bis - [p - (benzyl - dimethyl - ammonium) -phenyl]-tolylmethane dichloride.
1,1 - bis - [p - (benzyl - dimethyl - ammonium) - phenyl]-1-phenyl-ethane dichloride.
1,1 - bis - [p - (benzyl - dimethyl - ammonium) - phenyl]-3-phenyl-propane dichloride.
1,1 - bis - [p - (benzyl - dimethyl - ammonium) - phenyl]-cyclopentane dichloride.
1,1 - bis - [p - (benzyl - dimethyl - ammonium) - phenyl]-cyclohexane dichloride.
1,1 - bis - [p - (benzyl - dimethyl - ammonium) - phenyl]-cyclohexylmethane dichloride.

Although not specifically enumerated, it is to be understood that various salts other than the dihalides of any of the above compounds can be obtained, as explained previously, by the silver oxide method.

The bis-tertiary amines, from which the above enumerated compounds can be obtained by quaternization, are obtained, as described above, by the reaction of an appropriate aldehyde or ketone with dimethylaniline. Similarly, the diethylamino, dipropylamino, and dibutylamino homologues of the intermediate ketones of the above enumerated compounds are obtained by the reaction of the appropriate aldehyde or ketone with diethylaniline and dipropylaniline and dibutylaniline respectively. These intermediate amines are then quaternized, yielding the diethyl ammonium, dipropylammonium and dibutylammonium homologues of the above enumerated compounds.

The benzyl portion of the various quaternizing agents used to obtain the compounds of this invention may be nuclearly substituted, for example, by such substituents as p-methoxy, p-nitro, o-chloro, p-chloro, o,p-dichloro and p-bromo.

The compounds of this invention crystallize from various solvents or combination of solvents in the form of solvates or combination of solvates. Thus, upon crystallization of a single compound from various solvents or solvent combinations there is obtained a variety of solvate forms having varying melting points. The amount of a particular solvent included in a solvate of a compound embraced by this invention varies from compound to compound.

The characterization of the compounds of this invention by melting point is dependent upon the method of taking the melting point, the rate of heating, and the initial temperature of the melting point bath. The melting points reported herein were observed by placing the melting point sample in the melting point bath which had been heated previously to a temperature of approximately 10–15° C. below the anticipated melting point and then the bath was heated at a rate sufficient to raise its temperature approximately 1° C. per 10–15 seconds. Furthermore, the compounds described melt with evidence of decomposition.

The present invention is illustrated by, but not restricted to, the following examples:

*Example 1.—1,1-bis-[p-(benzyl-dimethyl-ammonium)-phenyl]-ethane dichloride.* 1,1-bis-(p-dimethylaminophenyl)ethane (93.9 gm., 0.35 mole) was added, with stirring, to a vessel containing freshly distilled benzyl chloride (354 gm., 2.8 mole). The air in the vessel was replaced by dry nitrogen, the vessel sealed and heated at 60° for 75 hours. After standing at room temperature for 17 hours, the reaction mixture was filtered and the solid washed free of benzyl chloride by repeatedly pulverizing under ethyl acetate and filtering the resulting suspension. The product was dried at room temperature in vacuum over concentrated sulfuric acid.

Purification was effected by repeated recrystallization as illustrated as follows: The product was dissolved in boiling isopropyl alcohol (135 ml.), filtered and the boiling filtrate treated with hot acetone (260 ml.). Upon cooling, 1,1-bis-[p - (benzyl - dimethyl - ammonium) - phenyl]-ethane dichloride separated in the form of solvated crystals. After three recrystallizations and drying at room temperature in vacuo, the solvated product melted with decomposition at 169–171° C. (uncorrected) when inserted in a melting point bath at 160° C. and heated at a rate of 1° C. per 10 seconds.

*Example 2.—1,1 - bis - [p - (benzyl - dimethyl-ammonium) -phenyl]-ethane dibromide.* 1,1-bis-(p-dimethylaminophenyl)-ethane (28.2 gm., 0.105 mole) was placed a vessel in which the air had been replaced by dry nitrogen. After cooling to −5° C., benzyl bromide (143.7 gm., 0.84 mole) was added with stirring. The flask was sealed and allowed to stand at room temperature for 4 hours. The reaction mixture was repeatedly washed by pulverizing under ethyl acetate and filtering the suspension. The product was dried at room temperature in vacuo over concentrated sulfuric acid.

The product was purified by recrystallization from a mixture of n-propyl alcohol and ethyl acetate and then from a mixture of acetone and water, illustrated as follows: The product was dissolved in boiling n-propyl alcohol (125 ml.), filtered and the boiling filtrate treated with hot ethyl acetate to incipient precipitation. Upon cooling, the solution deposited crystals. The product was then dissolved in boiling water (30 ml.), filtered and the boiling filtrate diluted with hot acetone (240 ml.) and 34% hydrobromic acid (0.5 ml.). The product was again recrystallized from a mixture of water (18 ml.), 34% hydrobromic acid (0.4 ml.) and acetone (90 ml.). The large colorless prisms separated as a hydrate that melted with decomposition at 180–182.5° C. (uncorrected) when inserted in a melting point bath at 170° C. and heated at a rate of 1° C. per 10 seconds.

*Example 3.—1,1 - bis - [p - (benzyl - dimethyl-ammonium) - phenyl] - butane dichloride.* 1,1-bis-(p-dimethylaminophenyl)-butane (10.4 gm., 0.035 mole) was dissolved in freshly distilled benzyl chloride (35.4 gm., 0.28 mole). The air in the container was replaced by dry nitrogen and the container sealed. After standing at room temperature for 168 hours, the reaction mixture was repeatedly washed by pulverizing under ethyl acetate and filtering the resulting suspension.

After drying at room temperature in vacuum over concentrated sulfuric acid, the product was recrystallized from a mixture of isopropyl alcohol and ethyl acetate, illustrated as follows: The dry solid was dissolved in boiling isopropyl alcohol (1.67 ml. for each gm. of solid), filtered, and the boiling filtrate treated with hot ethyl acetate (2.34 gm. for each gm. of solid). Upon cooling the solvated crystals of 1,1-bis-[p-(benzyl - dimethyl - ammonium) - phenyl]-butane dichloride separated. After two more recrystallizations in the same manner the product was dried in vacuum over concentrated sulfuric acid. The solvated product melted with decomposition at 173.5–176° C. (uncorrected) when inserted in a melting point bath at 165° C. and heated at a rate of 1° C. per 10 seconds.

*Example 4.—1,1 - bis - [p - (benzyl - dimethyl-ammonium) - phenyl] - butane dibromide.* 1,1-bis - (p - dimethylaminophenyl) - butane (31.2 gm., 0.105 mole) was placed in a vessel in which the air had been replaced by dry nitrogen. The flask was placed in a bath cooled to −5° C. and freshly distilled benzyl bromide (143.7 gm., 0.84 mole) added with stirring. The vessel was sealed and the mixture allowed to stand at room temperature for 7 hours. The reaction mixture was pulverized under ethyl acetate and the suspension filtered. This process was repeated once using acetone and again with ethyl acetate. The white solid was dried in vacuo over concentrated sulfuric acid.

Purification was effected by recrystallization first from a mixture of n-propyl alcohol and ethyl acetate, then from a mixture of water and acetone, illustrated as follows: The dry product was dissolved in boiling alcohol (250 ml.), filtered and the boiling filtrate was treated with ethyl acetate (160 ml.). The crystals that separated upon cooling were recrystallized by dissolving in hot water (32 ml.), filtering, and treating the hot filtrate with boiling acetone (365 ml.) and 34% hydrobromic acid (0.5 ml.). Upon cooling, the product separated in large colorless prisms. After another recrystallization from the same solvent, the crystals of 1,1-bis - [p - (benzyl - dimethyl - ammonium) -phenyl] - butane dibromide which contain water and acetone of solvent, melt with decomposition at 172–174° C. (uncorrected) when immersed in a melting bath at 165° C. and the temperature raised at a rate of 1° C. per 15 seconds.

*Example 5.—1,1-bis-[p-(benzyl-dimethyl-ammonium)-phenyl]-butane di-iodide.* When a concentrated aqueous solution of 1,1-bis-[p-(benzyl - dimethyl - ammonium) - phenyl] - butane dichloride was treated with a concentrated aqueous solution of sodium iodide (or potassium iodide), 1,1 - bis - [p - (benzyl - dimethyl - ammonium)-phenyl]-butane di-iodide separated.

*Example 6.—1,1-bis-[p-(benzyl-dimethyl-ammonium)-phenyl]-butane sulfate.* A water solution of 1,1-bis-[p-(benzyl-dimethyl-ammonium)-phenyl]-butane dichloride was stirred with an excess of silver oxide until the precipitation of silver chloride was complete. The mixture was filtered and the filtrate treated with the required quantity of a solution of sulfuric acid. After evaporation of the water, 1,1-bis-[p-(benzyl-dimethyl-ammonium)-phenyl]-butane sulfate was obtained.

*Example 7.—1,1-bis-[p-(benzyl-dimethyl-ammonium)-phenyl]-butane di-acetate.* The synthesis of this compound was carried out by a procedure similar to that described in Example 6, except sulfuric acid was replaced by acetic acid.

*Example 8.—1,1-bis-[p-(benzyl-dimethyl-ammonium)-phenyl]-butane di-propionate.* The preparation of this compound was carried out by a procedure similar to that described in Example 6, except sulfuric acid was replaced by propionic acid.

*Example 9.—1,1-bis-[p-(benzyl-dimethyl-ammonium)-phenyl]-butane di-p-toluenesulfonate.* The synthesis of this compound was carried out by a procedure similar to that described in Example 6, except sulfuric acid was replaced by p-toluenesulfonic acid.

Various other 1,1-bis-[p-(benzyl-dimethyl-ammonium)-phenyl]-butane salts are prepared by a procedure similar to that described in Example 6, by replacing the sulfuric acid with certain other inorganic or organic acids.

*Example 10.—1,1-bis-[p-(benzyl-dimethyl-ammonium)-phenyl]-pentane dichloride.* 1,1-bis-(p-dimethylaminophenyl)-pentane was prepared as follows: Dimethylaniline (121 gm., 1 mole), valeraldehyde (43.1 gm., 0.5 mole), concentrated hydrochloric acid (10.6 gm.) and anhydrous ethanol (50 ml.) was heated on a steam bath for 10 days. The reaction mixture was diluted with an equal volume of water and acidified with excess concentrated hydrochloric acid. The yellow solution was extracted three times with benzene and the aqueous solution made alkaline with excess concentrated aqueous ammonia. The precipitated oil was dissolved in benzene, washed with water, dried over anhydrous sodium sulfate. The benzene was removed by distillation and the residue fractionated at reduced pressure. The fraction boiling at 212–214° C. at about 1 mm. of pressure, solidified on standing. After several recrystallizations from methanol, the product melted at 54–56° C. (uncorrected).

Benzyl chloride (35.4 gm., 0.28 mole) was placed in a vessel and the air replaced by dry nitrogen. Pulverized 1,1-bis-(p-dimethylaminophenyl)-pentane (10.87 gm., 0.038 mole) was added with stirring and the vessel sealed. The solution was heated at 60° for 78 hours and then allowed to stand at room temperature for 165 hours.

The solid reaction mixture was pulverized under ethyl acetate and the resulting suspension filtered. This process was repeated using first acetone and then ethyl acetate. After drying in vacuum over concentrated sulfuric acid, the product was twice recrystallized from a mixture of isopropyl alcohol and acetone in a manner similar to that described in Example 1. After drying in vacuum over concentrated sulfuric acid, the solvated product melted with decomposition at 168–169° C. (uncorrected) when inserted in a melting point bath at 160° C. and heated at a rate of 1° per 10 seconds.

*Example 11.—1,1-bis-[p-(benzyl-dimethyl-ammonium)-phenyl]-pentane dibromide.* Benzyl bromide (88.9 gm., 0.523 mole) and 1,1-bis-(p-dimethylaminophenyl)-pentane (20.3 gm., 0.0654 mole) were allowed to react under conditions similar to those described in Example 2. The reaction product was pulverized under ethyl acetate and the suspension filtered. This process was repeated with acetone and finally with ethyl acetate. After drying in vacuum over concentrated sulfuric acid, the product was recrystallized by dissolving in boiling water (24 ml.), filtering and adding boiling acetone (230 ml.) to the hot filtrate. Upon cooling, the 1,1-bis-[p-(benzyl-dimethyl-ammonium)-phenyl]-pentane dibromide separated in large solvated crystals. After a second recrystallization from water and acetone, the solvated product melted with decomposition at 177–180° C. (uncorrected) when placed in a melting point bath at 170° C. and heated at a rate of 1° per 10 seconds.

*Example 12.—1,1-bis-[p-(benzyl-dimethyl-ammonium)-phenyl]-3-methylbutane dibromide.* 1,1-bis-(p-dimethylaminophenyl)-3-methyl-butane was prepared by a procedure similar to that described for 1,1-bis-(p-dimethylaminophenyl)-pentane (Example 10), except valeraldehyde was replaced by an equimolar quantity of isovaleraldehyde.

Quaternization was effected by a procedure similar to that described in Example 11 except 1,1-bis-(p-dimethylaminophenyl)-3-methylbutane was used in place of 1,1-bis-(p-dimethylaminophenyl)-pentane. There was obtained 1,1-bis-[p-(benzyl-dimethyl-ammonium)-phenyl]-3-methylbutane dibromide.

*Example 13.—1,1-bis-[p-(benzyl-dimethyl-ammonium)-phenyl]-dodecane dibromide.* 1,1-bis-(p-dimethylaminophenyl)-dodecane was prepared by a procedure similar to that described for 1,1-bis-(p-dimethylaminophenyl)-pentane (Example 10) except valeraldehyde was replaced by an equimolar quantity of dodecanal.

Quaternization was carried out by a procedure similar to that described in Example 11 except 1,1-bis-(p-dimethylaminophenyl)-dodecane was used in place of 1,1-bis-(p-dimethylaminophenyl)-pentane. There was obtained 1,1-bis-[p-(benzyl-dimethyl-ammonium)-phenyl]-dodecane dibromide.

*Example 14.—1,1-bis-[p-(benzyl-dimethyl-ammonium)-phenyl]-octadecane dibromide.* 1,1-bis-(p-dimethylaminophenyl)-octadecane was prepared by a procedure similar to that described for 1,1-bis-(p-dimethylaminophenyl)-pentane (Example 10) except valeraldehyde was replaced by an equimolar quantity of octadecanal.

Quaternization was carried out by a procedure similar to that described in Example 11 except 1,1-bis-(p-dimethylaminophenyl)-octadecane was used in place of 1,1-bis-(p-dimethylaminophenyl)-pentane. There was obtained 1,1-bis-[p-(benzyl-dimethyl-ammonium)-phenyl]-octadecane dibromide.

*Example 15. — Bis-[p-(benzyl-dimethyl-ammonium)-phenyl]-phenylmethane dibromide.* Benzyl bromide (102.6 gm., 0.6 mole) was added with stirring to a vessel containing bis-(p-dimethylaminophenyl)-phenylmethane (24.75 gm., 0.075 mole). The air in the vessel was replaced by nitrogen and the vessel sealed. The mixture was cooled, since it had become warm due to the heat of reaction.

After 16 hours the reaction mixture was ground under ethyl acetate and the suspension filtered. This process was repeated using first acetone and then ethyl acetate. After drying in vacuum over concentrated sulfuric acid, the product was three times recrystallized from absolute ethanol.

The solvated product melted with decomposition at 163–166° C. (uncorrected) when inserted in a melting point bath at 160° C. and heated at a rate of 1° C. per 10 seconds.

*Example 16. — Bis-[p-(benzyl-dimethyl-ammonium)-phenyl]-p-tolylmethane dibromide.* This compound was prepared by a procedure similar to that described for bis-[p-(benzyl-dimethyl-ammonium)-phenyl]-phenylmethane dibromide (Example 15). An equimolar quantity of bis-(p-dimethylaminophenyl)-p-tolylmethane was substituted for bis-(p-dimethylaminophenyl)-phenylmethane. There was obtained bis-[p-(benzyl-dimethyl-ammonium)-phenyl]-p-tolylmethane dibromide.

*Example 17. — Bis-[p-(benzyl-dimethyl-ammonium)-phenyl]-o-chlorophenylmethane dibromide.* This compound was prepared by a procedure similar to that described in Example 15 except that bis-(p-dimethylaminophenyl)- phenylmethane was replaced by an equimolar quantity of bis - (p - dimethylaminophenyl) - o-chlorophenylmethane. There was obtained bis-[p-(benzyl - dimethyl-ammonium) - phenyl] - o-chloro-phenylmethane dibromide. The solvated product melted with decomposition at 160–164° (uncorrected) when inserted at 150° and heated at a rate of 1° per 10 seconds.

*Example 18.—2,2-bis-[p-(benzyl-dimethyl-ammonium) - phenyl] - propane dibromide.* The known 2,2 - bis - (p - dimethylaminophenyl)-propane was prepared as follows: dimethylaniline (121 gm., 1 mole), acetone (29 gm., 0.5 mole), concentrated hydrochloric acid (88 ml.) and anhydrous ethanol (50 ml.) were heated at reflux on a steam bath for 31 days. The reaction mixture was diluted with twice its volume of water and made acid with an excess of hydrochloric acid. Any insoluble material was removed by extraction with benzene.

The aqueous solution was chilled and made alkaline with an excess of concentrated ammonium hydroxide. A solid separated which was removed by extraction with benzene. The benzene extract was dried over anhydrous sodium sulfate. The solvent was removed by distillation and the residue fractionated. The fraction boiling at 182–184° C. (uncorrected) at about 1 mm. pressure, solidified on cooling. After several recrystallizations the product melted at 82–83° (uncorrected).

2,2 - bis - (p - dimethylaminophenyl) - propane (19.8 gm., 0.07 mole) and benzyl bromide (95.8 gm., 0.56 mole) were allowed to react under conditions similar to those described in Example 15. After pulverizing and washing with ethyl acetate, acetone and finally ethyl acetate in the usual fashion, the product was dried in vacuum over concentrated sulfuric acid.

The product was recrystallized once from a mixture of water and acetone and twice from water alone. The solvated crystals separated as white prisms. After drying in vacuo over concentrated sulfuric acid, the product 2,2-bis-[p-(benzyl - dimethyl - ammonium) - phenyl]-propane dibromide, melted with decomposition at 191–193° C. (uncorrected) when inserted in a melting point bath at 185° C. and heated at a rate of 1° per 10 seconds.

*Example 19.—2,2-bis-[-p(benzyl-dimethyl-ammonium) - phenyl] - 4 - methylpentane dibromide.* 2,2 - bis - (p - dimethylaminophenyl)-4-methylpentane was prepared by a procedure similar to that described for 2,2-bis-(p-dimethylaminophenyl)-propane (Example 18) except that acetone was replaced by an equimolar quantity of methyl isobutyl ketone.

The preparation of the ammonium salt was carried out in a manner similar to that described in Example 18, except that 2,2-bis-(p-dimethylaminophenyl)-propane was replaced by an equimolar quantity of 2,2-bis-(p-dimethylaminophenyl)-4-methylpentane. There was obtained 2,2 - bis - [p - (benzyl - dimethyl - ammonium) -phenyl]-4-methylpentane dibromide.

*Example 20. — 2,2-bis-[p-(benzyl - dimethyl-ammonium)-phenyl]-octane dibromide.*—2,2-bis-(p-dimethylaminophenyl)-octane was prepared by a procedure similar to that described for 2,2-bis-(p-dimethylaminophenyl)-propane (Example 18) except that acetone was replaced by an equimolar quantity of 2-octanone.

Quaternization was carried out in a manner similar to that described in Example 18, except that 2,2-bis-(p-dimethylamino-phenyl)-propane was replaced by an equimolar quantity of 2,2-bis-(p-dimethylaminophenyl)-octane. There was obtained 2,2-bis-[p-(benzyl-dimethyl-ammonium)-phenyl]-octane dibromide.

*Example 21.—3,3-bis-[p-(benzyl-dimethyl-ammonium)-phenyl] - 1 - phenylbutane dibromide.* 3,3 - bis - (p - dimethylaminophenyl) - 1 - phenylbutane was prepared by a procedure similar to that described for 2,2-bis-(p-dimethylaminophenyl)-propane (Example 18) except that acetone was replaced by an equimolar quantity of benzylacetone.

Quaternization was carried out in a manner similar to that described in Example 18, except that 2,2-bis-(p-dimethylaminophenyl)-propane was replaced by an equimolar quantity of 3,3-bis-(p-dimethylaminophenyl) - 1 - phenylbutane. There was obtained 3,3-bis-[p-(benzyl-dimethyl-ammonium)-phenyl]-1-phenylbutane dibromide.

*Example 22.—3,3-bis-[p-(benzyl-dimethyl-ammonium)-phenyl]-pentane dibromide.* 3,3-bis-(p-dimethylaminophenyl)-pentane was prepared by a procedure similar to that described for 2,2-bis-(p-dimethylaminophenyl)-propane (Example 18) except that acetone was replaced by an equimolar quantity of diethyl ketone.

Quaternization was carried out in a manner similar to that described in Example 18, except that 2,2-bis-(p-dimethylaminophenyl)-propane was replaced by an equimolar quantity of 3,3-bis-(p-dimethylaminophenyl) - pentane. There was obtained 3,3-bis-[p-benzyl-dimethyl-ammonium)-phenyl]-pentane dibromide.

*Example 23.—1,1- bis -[p-(benzyl-diethyl-ammonium)-phenyl]-butane dibromide.* 1,1-bis-(p-diethylaminophenyl)-butane was prepared by a procedure similar to that described for 1, 1-bis-(p-dimethylaminophenyl)-pentane (Example 10) except that dimethylaniline was replaced by an equimolar quantity of diethylaniline and valeraldehyde was replaced by an equimolar quantity of butyraldehyde.

Quaternization was carried out in a manner similar to that described in Example 4, except that 1,1-bis-(p-dimethylaminophenyl) - butane was replaced by an equimolar quantity of 1,1-bis-(p-diethylaminophenyl)-butane. There was obtained 1,1-bis-[p - (benzyl - diethyl - ammonium)-phenyl]-butane dibromide.

*Example 24.—1,1-bis-[p-(benzyl-dibutyl-ammonium)-phenyl]-butane dibromide.* 1,1-bis-(p-dibutylaminophenyl)-butane was prepared by a procedure similar to that described for 1,1-bis-(p-dimethylaminophenyl)-pentane (Example 10) except that dimethylaniline was replaced by an equimolar quantity of dibutylaniline and valeraldehyde was replaced by an equimolar quantity of butyraldehyde.

Quaternization was carried out by a procedure similar to that described in Example 4, except that 1,1-bis-(p-dimethylaminophenyl) - butane was replaced by an equimolar quantity of 1,1-bis-(p-dibutylaminophenyl)-butane. There was obtained 1,1-bis-[p-(benzyl-dibutyl ammonium)-phenyl]-butane dibromide.

*Example 25.—1,1-bis-[p-(benzyl-dimethyl-ammonium)-phenyl]-cyclohexane dibromide.* Benzyl bromide (106 gms., 0.62 mole) and 1,1-bis-(p-dimethylaminophenyl)-cyclohexane (25 gms., 0.0775 mole) were allowed to react under conditions similar to that described in Example 2.

The product was pulverized under ethyl acetate and the resulting suspension filtered. This process was repeated using first benzene and then ethyl acetate. After drying in vacuum over concentrated sulfuric acid, the solid was twice recrystallized from a mixture of water and acetone. The product, 1,1-bis-[p-(benzyl-dimethyl-ammonium)-phenyl]-cyclohexane dibromide, separated in the form of white solvated crystals which meet with decomposition at 188–191° C. (uncorrected) when placed in a melting point bath at 180° and heated at a rate of 1° per 10 seconds.

*Example 26.—1,1-bis-[p-(benzyl-dimethyl-ammonium)-phenyl]-cyclopentane dibromide.* This compound was prepared by a procedure similar to that described in Example 25 except that 1,1-bis-(p-dimethylaminophenyl)-cyclohexane was replaced by an equimolar quantity of 1,1-bis-(p-dimethylaminophenyl)-cyclopentane. There was obtained 1,1-bis-[p-(benzyl-dimethyl-ammonium)-phenyl]-cyclopentane dibromide.

*Example 27.—1,1-bis-[p-(4-chlorobenzyl-dimethyl-ammonium)-phenyl]-ethane dichloride.* Using the materials and procedure outlined in Example 1 and substituting an equimolar quantity of 4-chlorobenzyl chloride for the benzyl chloride, there was obtained 1,1-bis-[p-(4-chlorobenzyl-dimethyl-ammonium)-phenyl]-ethane dichloride.

*Example 28.—1,1-bis-[p-(4-methoxybenzyl-dimethyl-ammonium)-phenyl]-ethane dichloride.* Using the materials and procedure outlined in Example 1 and substituting an equimolar quantity of 4-methoxybenzyl chloride for the benzyl chloride, there was obtained 1,1-bis-[p-(4-methoxybenzyl-dimethyl-ammonium)-phenyl]-ethane dichloride.

Similarly, other nuclearly substituted benzyl halides can be substituted for benzyl chloride in Example 1 and there are obtained a variety of nuclearly substituted benzyl quaternary ammonium dichlorides.

What is claimed is:

1. $z,z$-bis-[p-(benzyl-dimethyl-ammonium)-phenyl]-lower alkane dihalides in which $z$ is a whole number from 1 to 3 inclusive denoting the position of substitution.
2. 1,1-bis-[p-(benzyl-dimethylammonium)-phenyl]-butane dichloride.
3. 1,1-bis-[p-(benzyl-dimethylammonium)-phenyl]-ethane dichloride.
4. 2,2-bis-[p-(benzyl-dimethylammonium)-phenyl]-butane dibromide.

FRANK S. CROSSLEY.

REFERENCES CITED

The following references are of record in the file of this patent:

Frohlich: Ber. deut. Chem.," vol. 44 (1911), pp. 105–1070.

Kehlstadt: "Helv. Chim. Acta," vol. 27 (1944), pp. 685–701.